(12) United States Patent
Lee et al.

(10) Patent No.: US 11,048,031 B2
(45) Date of Patent: Jun. 29, 2021

(54) SEE-THROUGH DISPLAY APPARATUS

(71) Applicant: SAMSUNG ELECTRONICS CO., LTD., Suwon-si (KR)

(72) Inventors: Changkun Lee, Seoul (KR); Sunil Kim, Seoul (KR); Wontaek Seo, Yongin-si (KR); Geeyoung Sung, Daegu (KR); Bongsu Shin, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 16/281,262

(22) Filed: Feb. 21, 2019

(65) Prior Publication Data
US 2020/0124778 A1   Apr. 23, 2020

(30) Foreign Application Priority Data

Oct. 18, 2018   (KR) .......................... 10-2018-0124577

(51) Int. Cl.
*G02B 27/14*    (2006.01)
*G02B 5/30*     (2006.01)
(Continued)

(52) U.S. Cl.
CPC .......... *G02B 5/3025* (2013.01); *G02B 6/0028* (2013.01); *G02B 27/0172* (2013.01); *G02B 2027/0123* (2013.01)

(58) Field of Classification Search
CPC ................ G02B 5/3025; G02B 6/0028; G02B 27/0172; G02B 2027/0123
(Continued)

(56) References Cited

U.S. PATENT DOCUMENTS

| 2015/0260988 A1 | 9/2015 | Sugihara et al. |
| 2016/0116744 A1 | 4/2016 | Takeda et al. |

(Continued)

FOREIGN PATENT DOCUMENTS

| CN | 104536139 A | * | 4/2015 |
| CN | 104536139 B |   | 6/2017 |

(Continued)

OTHER PUBLICATIONS

Communication dated Nov. 8, 2019 by the European Patent Office in counterpart European Patent Application No. 19169375.3.

*Primary Examiner* — William Choi
(74) *Attorney, Agent, or Firm* — Sughrue Mion, PLLC

(57) ABSTRACT

A see-through display apparatus includes a display device, and an optical coupler configured to obtain a combined image by combining a first image from the display device with a second image from a path different from a path of the first image, and emit the obtained combined image. The optical coupler includes a first surface on which the first image is incident, a second surface on which the second image is incident, and an exit surface through which the combined image is emitted. A noise reduction prism is disposed between the display device and the optical coupler, and includes inclined surfaces configured to perform path conversion so that, among light of the first image, effective light of a predetermined angle range is incident on the optical coupler and noise light of a remaining angle range remaining from the predetermined angle range is not incident on the optical coupler.

26 Claims, 12 Drawing Sheets

(51) Int. Cl.
*F21V 8/00* (2006.01)
*G02B 27/01* (2006.01)

(58) Field of Classification Search
USPC .......................... 359/629, 630, 638; 345/7–9
See application file for complete search history.

(56) References Cited

U.S. PATENT DOCUMENTS

| | | |
|---|---|---|
| 2016/0139411 A1 | 5/2016 | Kang et al. |
| 2020/0050008 A1 | 2/2020 | Seo et al. |
| 2020/0096816 A1 | 3/2020 | Lee et al. |

FOREIGN PATENT DOCUMENTS

| | | |
|---|---|---|
| JP | 2015-111281 A | 6/2015 |
| KR | 10-2016-0113089 A | 9/2016 |
| WO | 2017/129029 A1 | 8/2017 |
| WO | 2018/093588 A2 | 5/2018 |

* cited by examiner

SEE-THROUGH DISPLAY APPARATUS

CROSS-REFERENCE TO RELATED APPLICATION

This application claims the benefit of Korean Patent Application No. 10-2018-0124577, filed on Oct. 18, 2018, in the Korean Intellectual Property Office, the disclosure of which is incorporated herein in its entirety by reference.

BACKGROUND

1. Field

The disclosure relates to see-through display apparatuses.

2. Description of the Related Art

Head-mounted displays that provide virtual reality (VR) have currently been commercially available and have been widely used in entertainment businesses. Head-mounted displays have also been developed for use in medicine, education, and other industrial applications.

An augmented reality (AR) display that is an advanced form of a VR display is an imaging apparatus that combines the real world with VR and may provide an interactive experience between the real world and VR. The interactive experience between the real world and VR is based on a function of providing information about a real world environment in real time, and perception of and interaction with the real world are further enhanced by overlaying a virtual object or information on the real world environment.

In the AR display, image noise and foreground noise may reach a user's field of view, thereby reducing visibility.

SUMMARY

Provided are see-through display apparatuses having reduced noise.

Additional aspects will be set forth in part in the description that follows and, in part, will be apparent from the description, or may be learned by practice of the presented embodiments.

According to an aspect of an embodiment, a see-through display apparatus includes a display device, and an optical coupler configured to obtain a combined image by combining a first image from the display device with a second image from a path different from a path of the first image, and emit the obtained combined image. The optical coupler includes a first surface on which the first image is incident, a second surface on which the second image is incident, and an exit surface through which the combined image is emitted. The see-through display apparatus further includes a noise reduction prism disposed between the display device and the optical coupler, and including a plurality of inclined surfaces configured to perform path conversion so that, among light of the first image, effective light of a predetermined angle range is incident on the optical coupler and noise light of a remaining angle range remaining from the predetermined angle range is not incident on the optical coupler.

The noise reduction prism may include an incident surface on which the first image is incident, a first inclined surface inclined with respect to the incident surface, and a second inclined surface inclined with respect to the first inclined surface, the second inclined surface facing the first surface of the optical coupler.

The first surface of the optical coupler may be parallel to the second inclined surface of the noise reduction prism.

An air gap may be disposed between the second inclined surface of the noise reduction prism and the first surface of the optical coupler so that the second inclined surface acts as a total reflection surface.

An inclination angle of the first inclined surface with respect to the incident surface may be set so that the effective light is totally reflected by the first inclined surface to the second inclined surface and a part of the noise light is transmitted through the first inclined surface.

An inclination angle of the second inclined surface with respect to the first inclined surface may be set so that the effective light is transmitted through the second inclined surface and is incident on the first surface of the optical coupler.

An inclination angle of the second inclined surface with respect to the first inclined surface may be set so that a part of the noise light that is totally reflected by the first inclined surface is totally reflected by the second inclined surface through the first inclined surface.

The second inclined surface may be connected to the incident surface.

An angle between the second inclined surface and the incident surface may be a right angle, and an angle between the first inclined surface and the incident surface may be different from an angle between the first inclined surface and the second inclined surface.

The noise reduction prism may further include a third inclined surface connecting the second inclined surface to the incident surface.

The third inclined surface may be parallel to the first inclined surface.

The noise reduction prism may further include a third inclined surface connecting the first inclined surface to the second inclined surface.

The third inclined surface may be parallel to the incident surface.

The noise reduction prism may be disposed so that the incident surface of the noise reduction prism and the exit surface of the optical coupler are on a same plane.

The noise reduction prism may be disposed so that the incident surface of the noise reduction prism and the second surface of the optical coupler are on a same plane.

An angle between the first surface and the second surface of the optical coupler may be an obtuse angle.

The optical coupler may include an optical waveguide including the first surface, the second surface, the exit surface, and a third surface opposite to the first surface, a beam splitter disposed in the optical waveguide and inclined with respect to the exit surface, and a concave mirror disposed adjacent to the third surface.

The beam splitter may include a half mirror.

The see-through display apparatus may further include a plurality of polarizers configured to prevent a part of light of the second image that is obliquely incident on the second surface from being emitted from the optical coupler.

The plurality of polarizers may include a first polarizer disposed on the second surface, and a second polarizer disposed on the first surface and having a polarization axis perpendicular to a polarization axis of the first polarizer.

The see-through display apparatus may further include a quarter-wave plate disposed between the third surface and the concave mirror, and a third polarizer disposed on the exit surface and having a polarization axis parallel to the polarization axis of the first polarizer.

The see-through display apparatus may further include an elliptically polarizing plate disposed on one surface of the beam splitter.

The see-through display apparatus may be a wearable device.

According to an aspect of an embodiment, a see-through display apparatus includes a display device, and an optical coupler configured to obtain a combined image by combining a first image from the display device along a first path, with a second image from a second path different from the first path, and emit the obtained combined image. The optical coupler includes a first surface on which the first image is incident, a second surface on which the second image is incident, and an exit surface through which the combined image is emitted. The see-through display apparatus further includes a noise reduction prism disposed between the display device and the optical coupler, and including an incident surface on which the first image from the display device is incident, a first inclined surface inclined with respect to the incident surface, and a second inclined surface inclined with respect to the first inclined surface, the second inclined surface facing the first surface of the optical coupler. A first angle between the incident surface and the first inclined surface, a second angle between the first inclined surface and the second inclined surface, and a third angle between the second inclined surface and the incident surface are set so that, among light of the first image, effective light of a predetermined angle range is incident on the optical coupler and noise light of a remaining angle range remaining from the predetermined angle range is not incident on the optical coupler.

The first angle the second angle and the third angle may be set further based on a critical angle for total reflection that is determined by the predetermined angle range of the effective light and a refractive index of the noise reduction prism.

The display device, the incident surface and the exit surface may be on a same plane, and an end portion of the optical coupler may be cut so that the display device is disposed between the incident surface and the exit surface.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
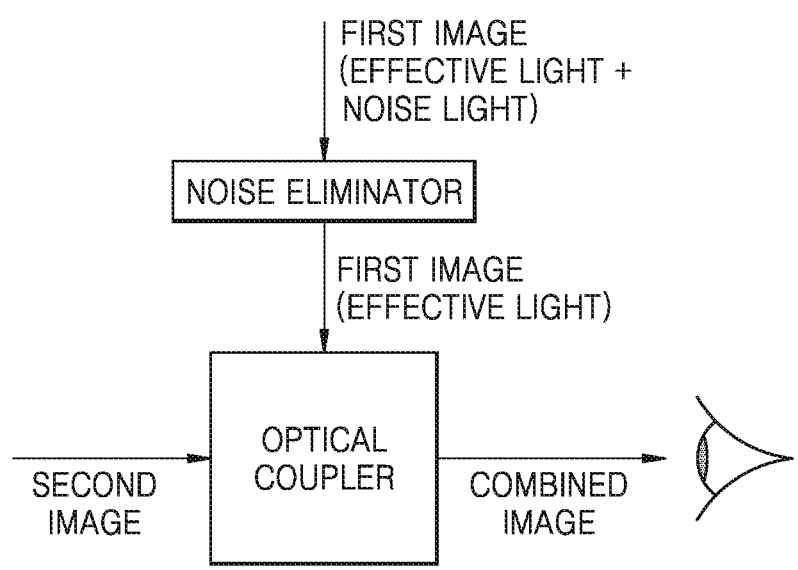
FIG. 1 is a conceptual diagram illustrating a configuration of a see-through display apparatus according to an embodiment.

The disclosure will now be described more fully with reference to the accompanying drawings, in which embodiments are shown. The same reference numerals in the drawings denote the same elements, and sizes of elements in the drawings may be exaggerated for clarity and convenience of explanation. Also, embodiments are described, and various modifications may be made from the embodiments.

For example, it will also be understood that when a layer is referred to as being "on" another layer, it may be directly on the other layer, or intervening layers may also be present therebetween.

As used herein, the singular forms "a," "an," and "the" are intended to include the plural forms as well, unless the context clearly indicates otherwise. It will be further understood that the terms "comprises" and/or "comprising" used herein specify the presence of stated components, but do not preclude the presence or addition of one or more other components.

The use of the terms "a" and "an," and "the" and similar referents in the context of describing the embodiments (especially in the context of the following claims) is to be construed to cover both the singular and the plural.

Also, the steps of all methods described herein may be performed in any suitable order unless otherwise indicated herein or otherwise clearly contradicted by context. The disclosure is not limited to the described order of the steps. The use of any and all examples, or example language (e.g., "such as") provided herein, is intended to better illuminate the disclosure and does not pose a limitation on the scope of the disclosure unless otherwise claimed.

As used herein, the term "and/or" includes any and all combinations of one or more of the associated listed items. Expressions such as "at least one of," when preceding a list of elements, modify the entire list of elements and do not modify the individual elements of the list.

FIG. 1 is a conceptual diagram illustrating a configuration of a see-through display apparatus according to an embodiment.

The see-through display apparatus according to an embodiment is a display apparatus that may combine a first image and a second image from different paths to obtain a combined image and may provide the combined image to an observer. The first image may be, for example, an image formed by a display device and the second image may be a foreground image, that is, a real environment image.

The first image formed by the display device may include effective light and noise light. Light of the first image undergoes reflection, refraction, focusing, etc. in an optical path through an optical coupler until reaching the observer's field of view. In this case, according to an emission angle of the light of the first image, part of the light of the first image that is reflected, refracted, and focused at a desired position and reaches the observer's field of view may be referred to as effective light, and part of the light of the first image that is reflected, refracted, and focused at a non-desired position and then reaches the observer's field of view to reduce image quality may be referred to as noise light.

The see-through display apparatus according to an embodiment includes a noise eliminator at a side of the optical coupler on which light is incident to minimize noise. The noise eliminator performs path conversion so that, from among light of the first image, only effective light is incident on the optical coupler and noise light is not incident on the optical coupler, that is, is emitted to the outside of the see-through display apparatus.

Accordingly, a combined image obtained by combining the light of the second image with the light of the first image that does not include the noise light may be provided to the observer's field of view.

The first image may be a virtual reality (VR) image formed by the display device to include additional information about the second image of the real environment, and the see-through display apparatus of an embodiment may be applied to an augmented reality (AR) display apparatus.

Figure 2:
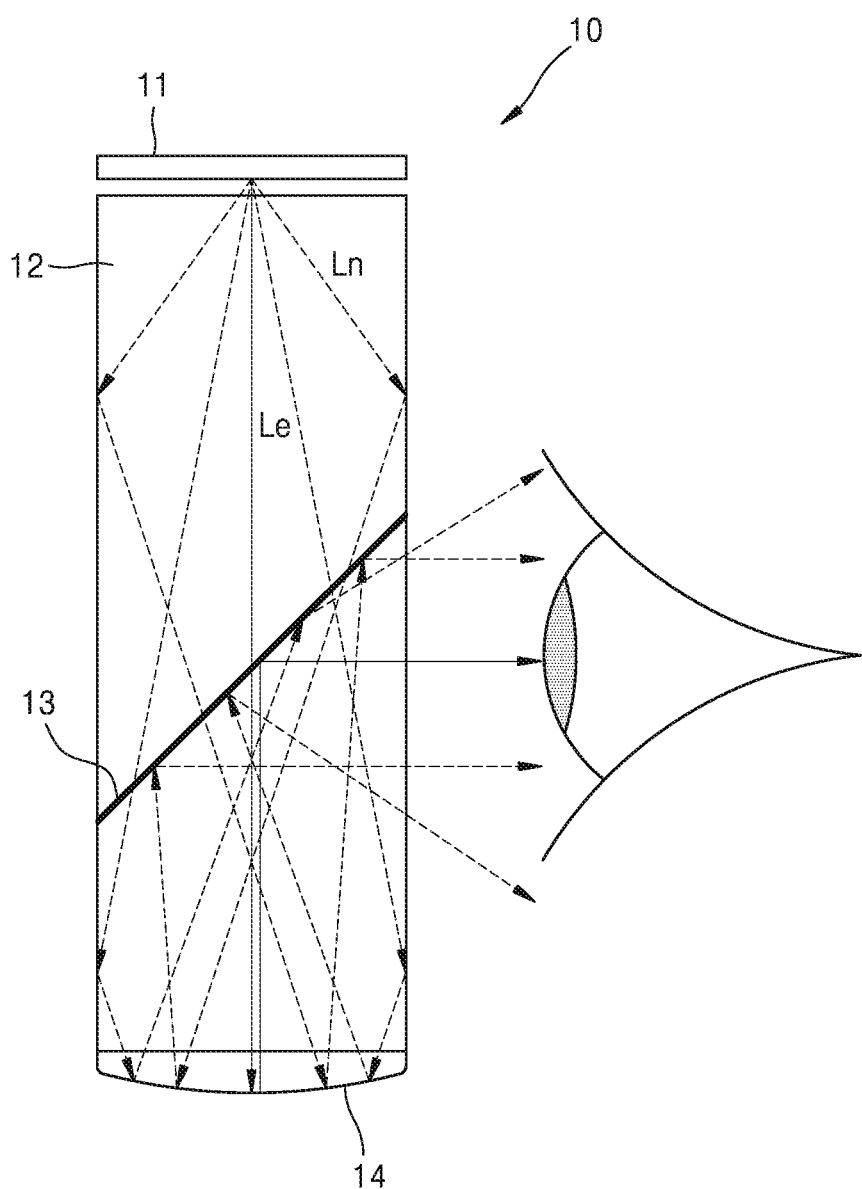
FIG. 2 is a view illustrating an optical path along which noise light reaches a field of view in a see-through display apparatus according to a comparative example.

FIG. 2 is a view illustrating an optical path through which noise light reaches a field of view in a see-through display apparatus 10 according to a comparative example.

The see-through display apparatus 10 according to the comparative example includes a display device 11, an optical waveguide 12, a beam splitter 13, and a concave mirror 14.

The optical waveguide 12, the beam splitter 13, and the concave mirror 14 collectively function as an optical coupler that combines light of a first image from the display device 11 with light of a second image that is an external image.

Upon examining an optical path along which light from the see-through display apparatus 10 reaches an observer's field of view, noise light Ln indicated by a dashed line, in addition to effective light Le indicated by a solid line, reaches the observer's field of view.

A see-through display apparatus according to an embodiment employs a structure in which only the effective light Le from among image light from a display device 100 may reach an optical coupler so that the noise light Ln is prevented from reaching the observer's field of view.

Figure 3:
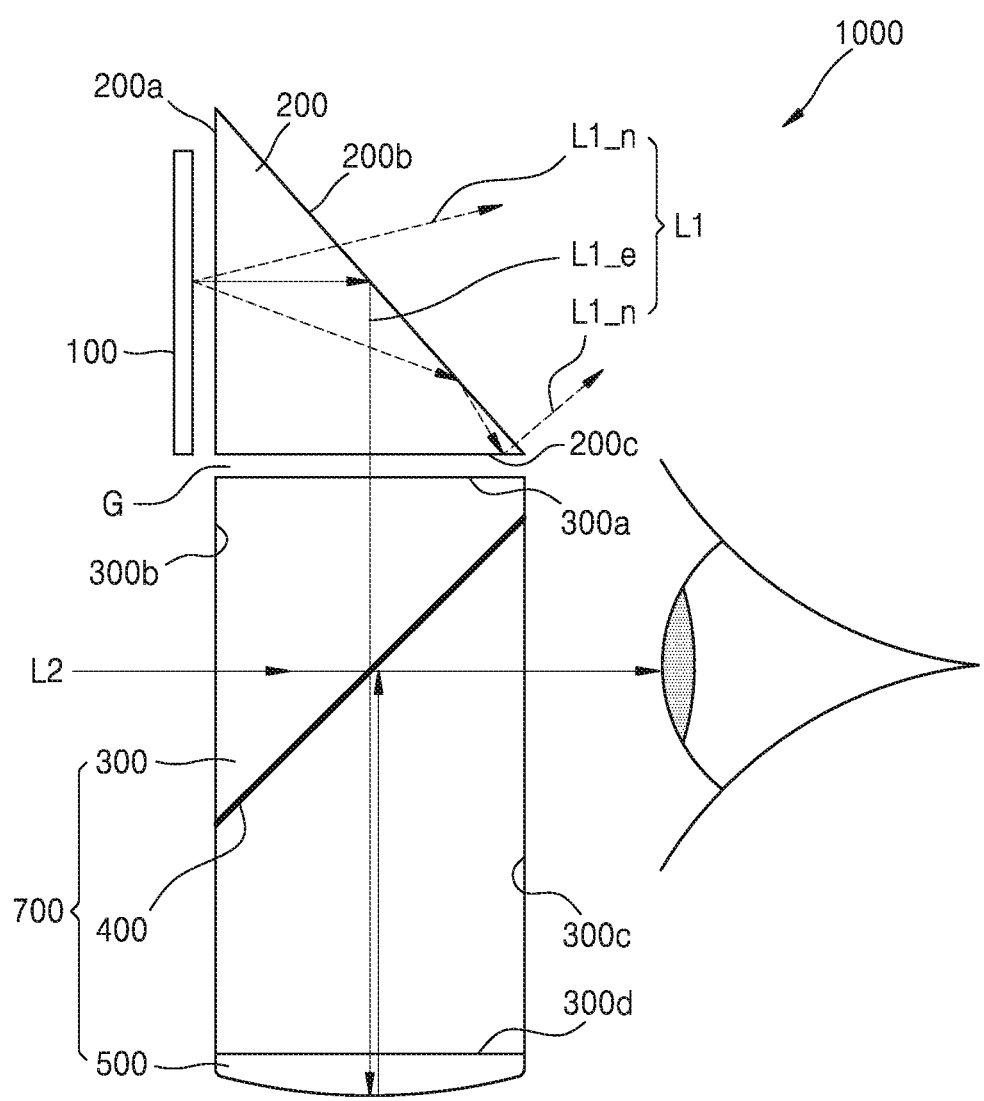
FIG. 3 is a view illustrating a configuration and an optical arrangement of a see-through display apparatus according to an embodiment.
Figure 4:
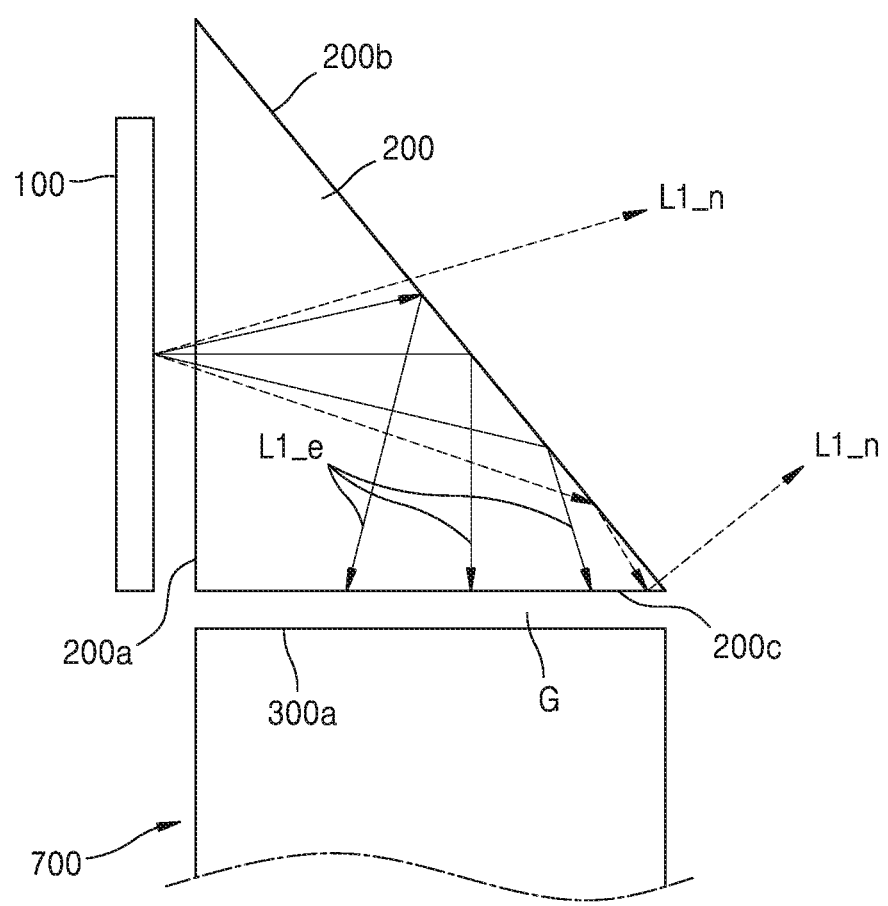
FIG. 4 is a detailed view illustrating, according to an incidence angle, an optical path of light incident on a noise reduction prism provided in the see-through display apparatus of FIG. 3.

FIG. 3 is a view illustrating a configuration and an optical arrangement of a see-through display apparatus 1000 according to an embodiment. FIG. 4 is a detailed view illustrating, according to an incidence angle, an optical path of light incident on a noise reduction prism 200 provided in the see-through display apparatus 1000 of FIG. 3.

The see-through display apparatus 1000 includes the display device 100, an optical coupler 700 configured to combine first light L1 of a first image formed by the display device 100 with second light L2 of a second image from a path different from a path of the first image, and the noise reduction prism 200 located between the display device 100 and the optical coupler 700 and configured to perform path conversion so that noise light $L1\_n$ from among the first light L1 is not incident on the optical coupler 700.

The display device 100 forms the first light L1 of the first image by modulating light according to first image information. The first image may be a two-dimensional (2D) image or a three-dimensional (3D) image, and examples of the 3D image may include a holographic image, a stereoscopic image, a light field image, and an integral photography (IP) image, and may include a multi-view image or a super multi-view image.

Examples of the display device 100 may include a liquid crystal on silicon (LCoS) device, a liquid crystal display (LCD) device, an organic light-emitting diode (OLED) display device, or a digital micromirror device (DMD), and may include a next-generation display device such as a micro-LED device, a quantum dot (QD) display device, or an LED device.

The optical coupler 700 for combining the first light L1 of the first image with the second light L2 of the second image and emitting a combined image includes a first surface 300a on which the first image is incident, a second surface 300b on which the second image is incident, and an exit surface 300c through which the combined image is emitted.

The optical coupler 700 includes an optical waveguide 300 including the first surface 300a, the second surface 300b, the exit surface 300c, and a third surface 300d opposite to the first surface 300a, a beam splitter 400 located in the optical waveguide 300 and inclined with respect to the exit surface 300c, and a concave mirror 500 located adjacent to the third surface 300d.

The beam splitter 400 may be a half mirror for reflecting part of incident light and transmitting part of the incident light. However, the present embodiment is not limited thereto, and a polarization beam splitter for reflecting one polarized light and transmitting another polarized light may be used as the beam splitter 400.

The concave mirror 500 includes a concave reflective surface so that the first light L1 passes through the concave mirror 500 and the beam splitter 400 and then is focused on an observer's field of view.

The noise reduction prism 200 includes a plurality of inclined surfaces that change an optical path so that, from among the first light L1 of the first image, effective light $L1\_e$ of a predetermined angle range is incident on the optical coupler 700 and the noise light $L1\_n$ of a remaining angle range is not incident on the optical coupler 700.

Referring to FIG. 4, the noise reduction prism 200 includes an incident surface 200a on which the first image is incident, a first inclined surface 200b inclined with respect to the incident surface 200a, and a second inclined surface 200c inclined with respect to the first inclined surface 200b and facing the first surface 300a of the optical coupler 700.

The first surface 300a of the optical coupler 700 and the second inclined surface 200c of the noise reduction prism 200 may be parallel to each other.

An air gap G may be formed between the second inclined surface 200c of the noise reduction prism 200 and the first surface 300a of the optical coupler 700 so that the second inclined surface 200c acts as a total reflection surface. However, the present embodiment is not limited thereto and, for example, a material having a refractive index lower than a refractive index of the noise reduction prism 200 may be filled in the air gap G.

Inclination angles of the first inclined surface 200b and the second inclined surface 200c may be determined so that the effective light $L1\_e$ is incident on the first surface 300a of the optical coupler 700 and the noise light $L1\_n$ escapes from the see-through display apparatus 1000 without being incident on the first surface 300a of the optical coupler 700.

Upon examining a path of the effective light $L1\_e$, the effective light $L1\_e$ may be totally reflected by the first inclined surface 200b to the second inclined surface 200c, may pass through the second inclined surface 200c without being totally reflected by the second inclined surface 200c, and may be incident on the first surface 300a of the optical coupler 700.

Upon examining a path of the noise light L1_n, the noise light L1_n may be transmitted through the first inclined surface 200b, or may be totally reflected by the first inclined surface 200b to the second inclined surface 200c and then may be totally reflected by the second inclined surface 200c.

Angles of the first inclined surface 200b and the second inclined surface 200c may be determined so that such optical paths are formed for the effective light L1_e of the predetermined angle range and the noise light L1_n of the remaining range.

An inclination angle of the first inclined surface 200b with respect to the incident surface 200a may be determined so that the effective light L1_e is totally reflected by the first inclined surface 200b and at least part of the noise light L1_n is transmitted through the first inclined surface 200b to the outside.

An inclination angle of the second inclined surface 200c with respect to the first inclined surface 200b may be determined so that the effective light L1_e is transmitted through the second inclined surface 200c and is incident on the first surface 300a of the optical coupler 700 and the noise light L1_n totally reflected by the first inclined surface 200b and incident on the second inclined surface 200c is totally reflected by the second inclined surface 200c.

Such angles are determined by also considering a critical angle for total reflection determined by an angle range of the effective light L1_e and a refractive index of the noise reduction prism 200.

As shown in FIG. 4, the noise reduction prism 200 may have, but is not limited to, a triangular prism shape in which the second inclined surface 200c and the incident surface 200a are connected to each other.

A shape of the noise reduction prism 200 may be determined by also considering an arrangement of the optical coupler 700 and the display device 100 in addition to the above requirements. For example, the requirements may be satisfied by causing an angle between the second inclined surface 200c and the incident surface 200a to be a right angle (90°) and causing an angle between the first inclined surface 200b and the incident surface 200a and an angle between the first inclined surface 200b and the second inclined surface 200c to be different from each other. However, the present embodiment is not limited thereto, and the requirements may also be satisfied even when the two angles are the same according to an angle range of the effective light L1_e and a refractive index of the noise reduction prism 200.

Figure 5:
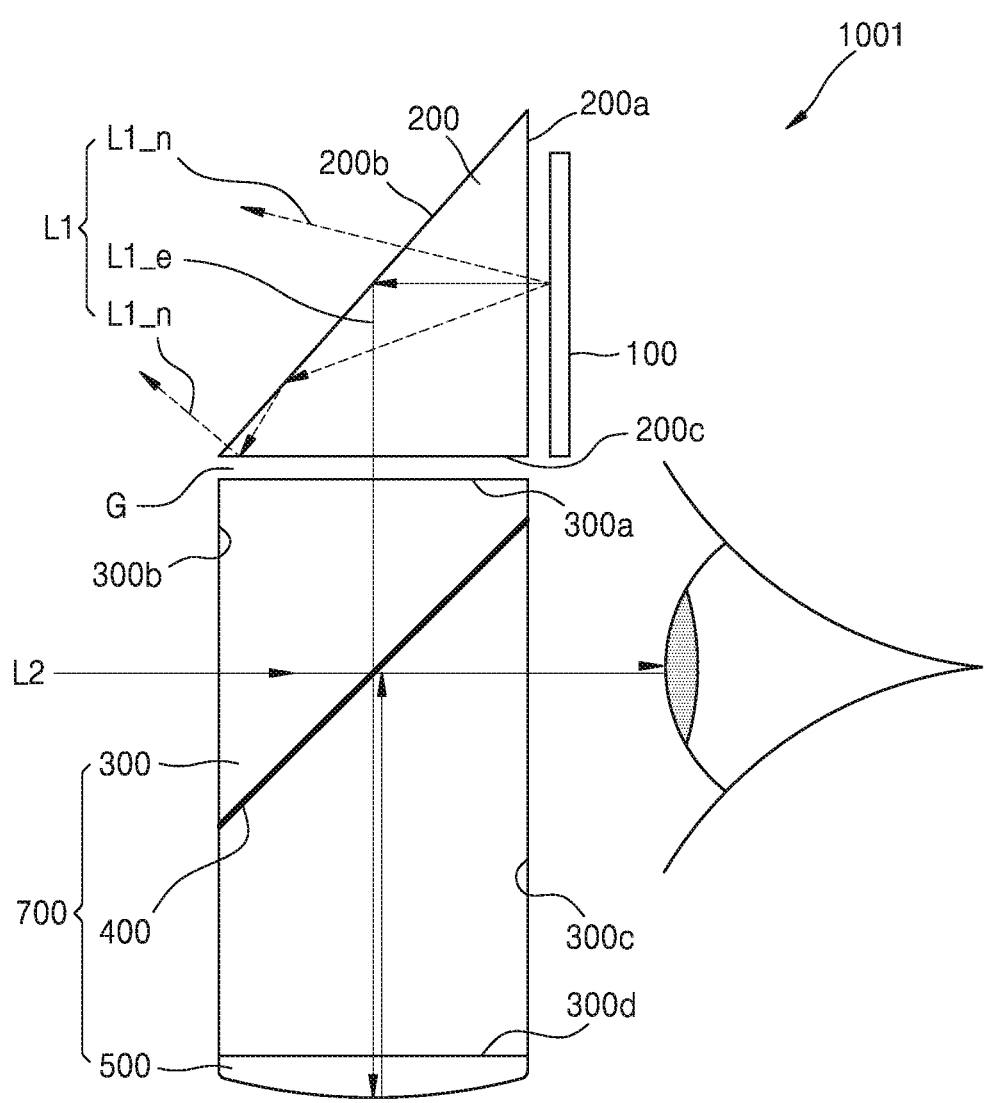
FIG. 5 is a view illustrating a configuration and an optical arrangement of a see-through display apparatus according to another embodiment.

FIG. 5 is a view illustrating a configuration and an optical arrangement of a see-through display apparatus 1001 according to another embodiment.

The see-through display apparatus 1001 includes the display device 100, the optical coupler 700 configured to combine the first light L1 of the first image formed by the display device 100 with the second light L2 of the second image from a path different from a path of the first image, and the noise reduction prism 200 located between the display device 100 and the optical coupler 700 and configured to perform path conversion so that, from among the first light L1, the noise light L1_n is not incident on the optical coupler 700 and the effective light L1_e is incident on the optical coupler 700.

The see-through display apparatus 1001 of the preset embodiment is substantially the same as the see-through display apparatus 1000 of FIG. 3 except for an arrangement of the display device 100 and the noise reduction prism 200.

While the noise reduction prism 200 is located so that the incident surface 200a of the noise reduction prism 200 and the second surface 300b of the optical coupler 700 are on the same plane in the see-through display apparatus 1000 of FIG. 3, the noise reduction prism 200 is located so that the incident surface 200a of the noise reduction prism 200 and the exit surface 300c of the optical coupler 700 are on the same plane in the see-through display apparatus 1001 of the present embodiment.

Figure 6:
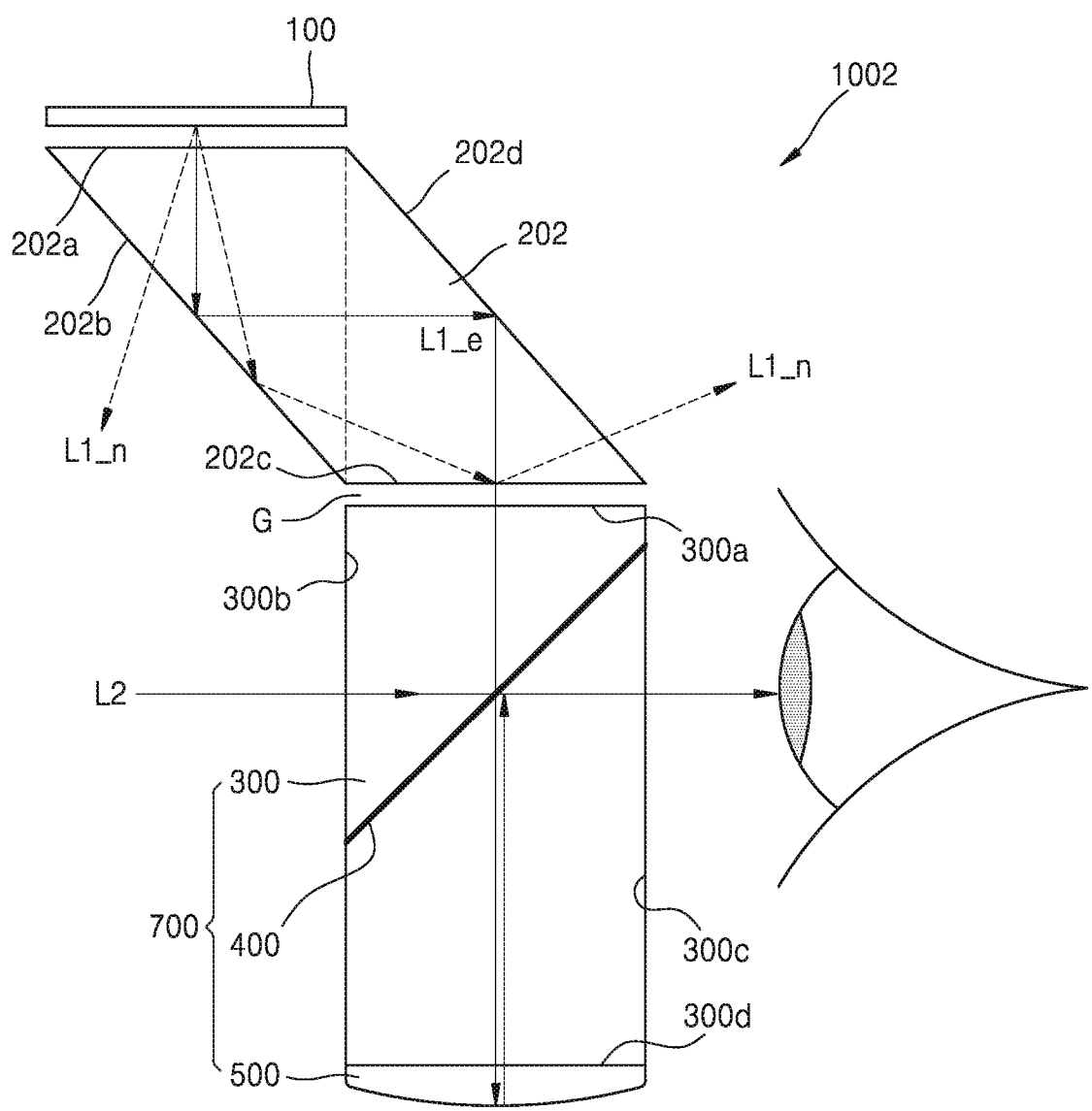
FIG. 6 is a view illustrating a configuration and an optical arrangement of a see-through display apparatus according to another embodiment.

FIG. 6 is a view illustrating a configuration and an optical arrangement of a see-through display apparatus 1002 according to another embodiment.

The see-through display apparatus 1002 includes the display device 100, the optical coupler 700 configured to combine the first light L1 of the first image formed by the display device 100 with the second light L2 of the second image from a path different from a path of the first image, and a noise reduction prism 202 located between the display device 100 and the optical coupler 700 and configured to perform path conversion so that, from among the first light L1, the noise light L1_n is not incident on the optical coupler 700 and the effective light L1_e is incident on the optical coupler 700.

The see-through display apparatus 1002 of the present embodiment is substantially the same as the see-through display apparatus 1000 of FIG. 3 except for a position of the display device 100 and a shape of the noise reduction prism 202.

The noise reduction prism 202 includes an incident surface 202a on which the first image is incident, a first inclined surface 202b inclined with respect to the incident surface 202a, a second inclined surface 202c inclined with respect to the first inclined surface 202b and facing the first surface 300a of the optical coupler 700, and a third inclined surface 202d connecting the incident surface 202a to the second inclined surface 202c.

The noise reduction prism 202 may have a shape in which two triangular prisms having the same shape are connected to each other so that the third inclined surface 202d is parallel to the first inclined surface 202b.

From among light from the display device 100, the noise light L1_n may be transmitted through the first inclined surface 202b, or may be totally reflected by the first inclined surface 202b and then may be totally reflected by the second inclined surface 202c to escape from the see-through display apparatus 1002 without being incident on the optical coupler 700, and the effective light L1_e may be transmitted through the first inclined surface 202b and the third inclined surface 202d to the optical coupler 700.

Figure 7:
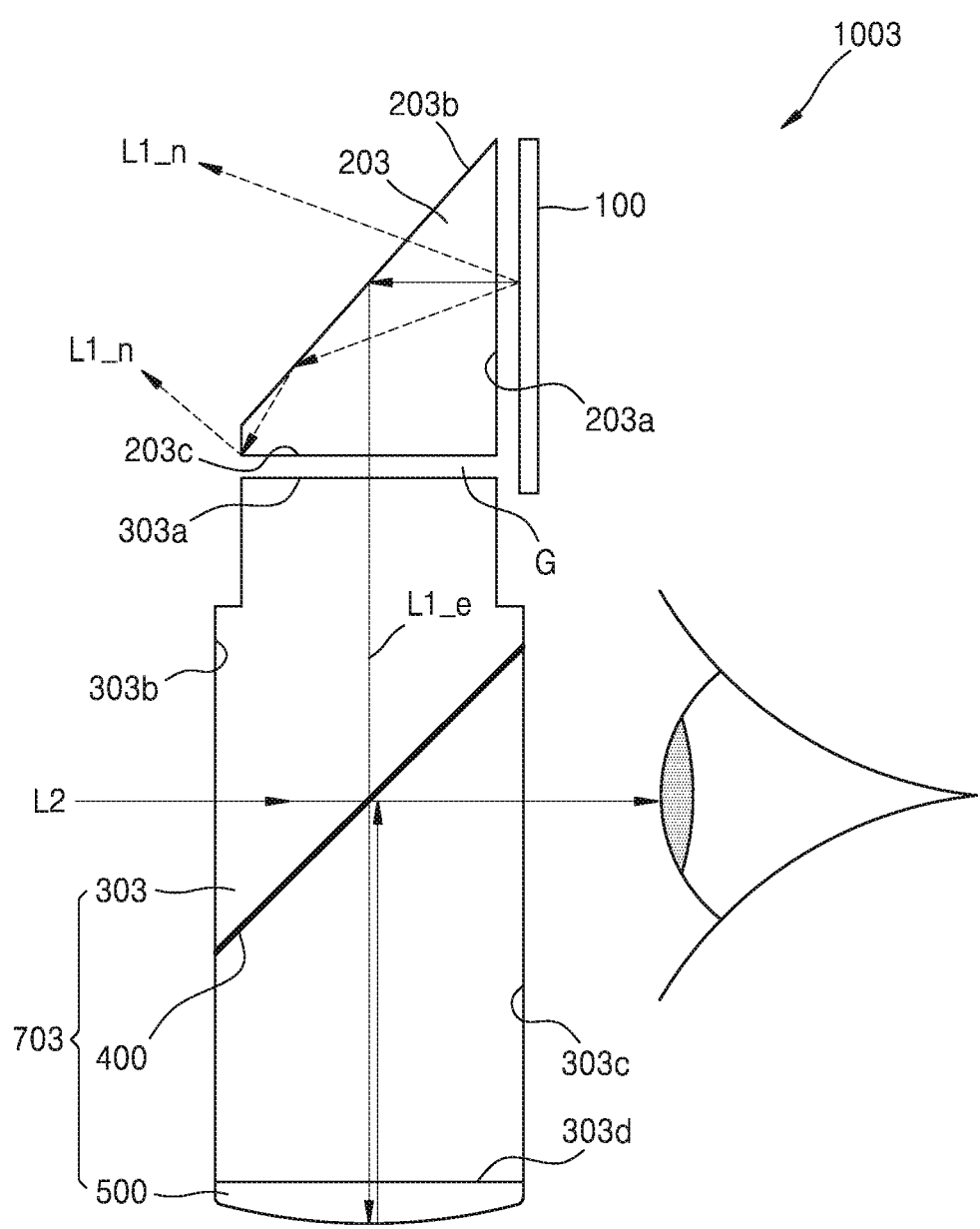
FIG. 7 is a view illustrating a configuration and an optical arrangement of a see-through display apparatus according to another embodiment.

FIG. 7 is a view illustrating a configuration and an optical arrangement of a see-through display apparatus 1003 according to another embodiment.

The see-through display apparatus 1003 includes the display device 100, an optical coupler 703 configured to combine the first light L1 of the first image formed by the display device 100 with the second light L2 of the second image from a path different from a path of the first image, and a noise reduction prism 203 located between the display device 100 and the optical coupler 703 and configured to perform path conversion so that, from among the first light L1, the noise light L1_n is not incident on the optical coupler 703 and the effective light L1_e is incident on the optical coupler 703.

The see-through display apparatus 1003 is substantially the same as the see-through display apparatus 1001 of FIG. 5 except that the noise reduction prism 203 (including inclined surfaces 203b and 203c) and an optical wave guide 303 of the optical coupler 703 is formed such that end portions of the noise reduction prism 200 and an optical waveguide 300 (including a first surface 303a, a second surface 303b and a third surface 303d) are cut to reduce a thickness, that is, a horizontal width in FIG. 7.

An incident surface 203a of the noise reduction prism 203 is shifted toward a traveling direction of the first light L1 when compared to the see-through display apparatus 1001 of FIG. 5, and the display device 100 is located between an exit surface 303c of the optical coupler 703 and the incident surface 203a of the noise reduction prism 203. That is, the display device 100 is located on the same plane as the exit surface 303c of the optical coupler 703, and thus a horizontal width of the see-through display apparatus 1003 is reduced to be less than that of the see-through display apparatus 1001 of FIG. 5.

Figure 8:
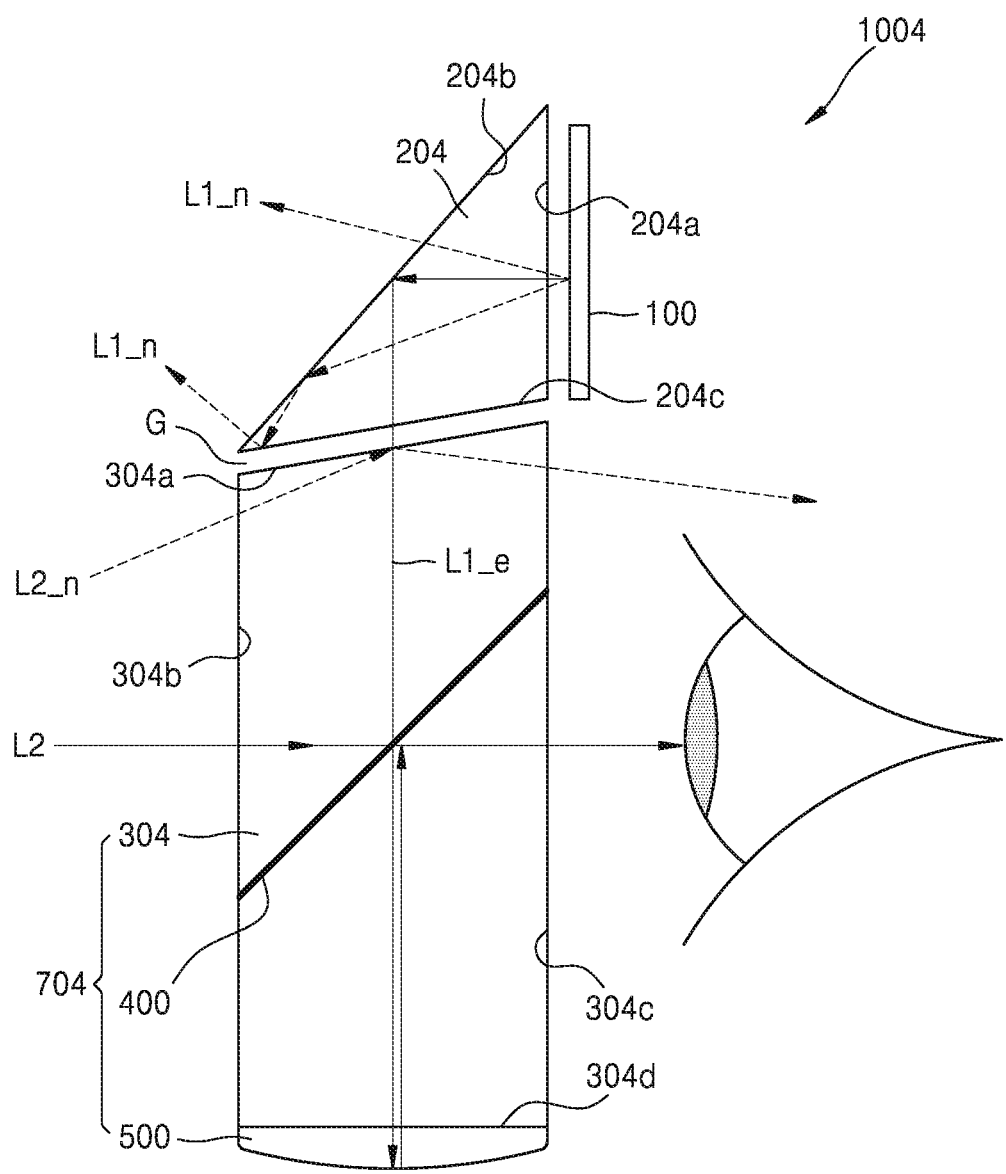
FIG. 8 is a view illustrating a configuration and an optical arrangement of a see-through display apparatus according to another embodiment.

FIG. 8 is a view illustrating a configuration and an optical arrangement of a see-through display apparatus 1004 according to another embodiment.

The see-through display apparatus 1004 includes the display device 100, an optical coupler 704 configured to combine the first light L1 of the first image formed by the display device 100 with the second light L2 of the second image from a path different from a path of the first image, and a noise reduction prism 204 located between the display device 100 and the optical coupler 704 and configured to perform path conversion so that, from among the first light L1, the noise light L1_n is not incident on the optical coupler 704 and the effective light L1_e is incident on the optical coupler 704.

The see-through display apparatus 1004 of the present embodiment is substantially the same as the see-through display apparatus 1001 of FIG. 5 except for a shape of the noise reduction prism 204 and a shape of an optical waveguide 304.

The optical waveguide 304 includes a first surface 304a on which the first light L1 is incident, a second surface 304b on which the second light L2 is incident, an exit surface 304c through which light of a combined image is emitted, and a third surface 304d opposite to the first surface 304a. An angle between the first surface 304a and the second surface 304b is an obtuse angle, that is, an angle greater than 90°.

The noise reduction prism 204 includes an incident surface 204a, a first inclined surface 204b, and a second inclined surface 204c, and the second inclined surface 204c is parallel to the first surface 304a of the optical coupler 704. Accordingly, an angle between the incident surface 204a and the second inclined surface 204c of the noise reduction prism 204 is the same obtuse angle as that between the first surface 304a and the second surface 304b of the optical coupler 704. Two remaining angles of the noise reduction prism 204 may be determined so that the noise light L1_n escapes from the see-through display apparatus 1004 and the effective light L1_e is incident on the first surface 304a of the optical coupler 704.

Because the optical waveguide 304 is shaped so that an angle between the first surface 304a and the second surface 304b is an obtuse angle, noise light L2_n from among the second light L2 of the second image may not reach an observer's field of view. As shown in FIG. 8, the noise light L2_n obliquely incident on the optical coupler 704 may be totally reflected by the first surface 304a and may escape from the see-through display apparatus 1004 without reaching the observer's field of view.

Figure 9:
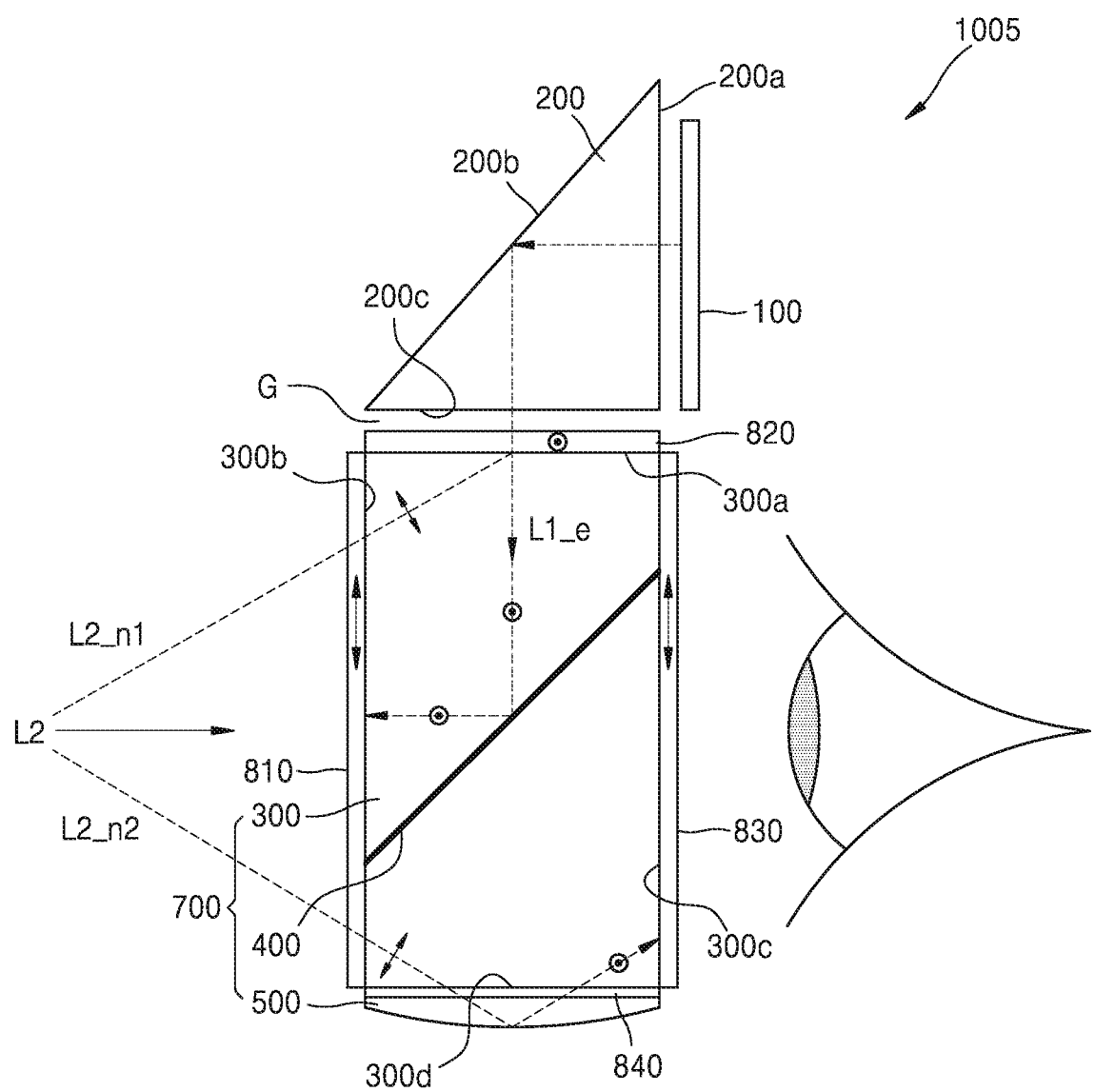
FIG. 9 is a view illustrating a configuration and an optical arrangement of a see-through display apparatus according to another embodiment.

FIG. 9 is a view illustrating a configuration and an optical arrangement of a see-through display apparatus 1005 according to another embodiment.

The see-through display apparatus 1005 includes the display device 100, the optical coupler 700 configured to combine the first light L1 of the first image formed by the display device 100 with the second light L2 of the second image from a path different from a path of the first image, and the noise reduction prism 200 located between the display device 100 and the optical coupler 700 and configured to perform path conversion so that, from among the first light L1, the noise light L1_n is not incident on the optical coupler 700 and the effective light L1_e is incident on the optical coupler 700.

The see-through display apparatus 1005 of the preset embodiment is substantially the same as the see-through display apparatus 1001 of FIG. 5 except that optical members are further provided so that noise light L2_n1 and noise light L2_n2 from among the second light L2 of the second image do not reach an observer's field of view.

A first polarizer 810 is located on the second surface 300b of the optical waveguide 300 and a second polarizer 820 is located on the first surface 300a of the optical waveguide 300. The first polarizer 810 and the second polarizer 820 may have polarization axes that are perpendicular to each other. For example, the first polarizer 810 may have a polarization axis for transmitting light of a first polarization (↔) and the second polarizer 820 may have a polarization axis for transmitting light of a second polarization (⊙).

The noise light L2_n1 does not reach the observer's field of view due to the first and second polarizers 810 and 820. The noise light L2_n1 passes through the first polarizer 810 to become the light of the first polarization (↔), is incident on the second polarizer 820 perpendicular to the first polarizer 810, and is not transmitted through the second polarizer 820.

Also, a quarter-wave plate 840 may be located on the third surface 300d of the optical waveguide 300, and a third polarizer 830 may be located on the exit surface 300c of the optical waveguide 300. The third polarizer 830 may have the same polarization axis as that of the first polarizer 810. That is, the third polarizer 830 may have a polarization axis for transmitting light of the first polarization (↔).

The noise light L2_n2 does not reach the observer's field of view due to the quarter-wave plate 840 and the third polarizer 830. The noise light L2_n2 passes through the first polarizer 810 to become light of the first polarization (↔), is transmitted through the quarter-wave plate 840 to become circularly polarized light, and is reflected by the concave mirror 500 to become circularly polarized light in the opposite direction. Next, the noise light L2_n2 passes through the quarter-wave plate 840 to become light of the second polarization (⊙) and is incident on the third polarizer 830. Because the third polarizer 830 transmits only light of the first polarization (↔), the noise light L2_n2 of the second polarization (⊙) is absorbed by the third polarizer 830.

The see-through display apparatus 1005 constructed as described above may remove the noise light L2_n1 and the noise light L2_n2 of the second light L2 not to be incident on the observer's field of view and may prevent part of the effective light L1_e from the display device 100 from leaking outward when being reflected by the beam splitter 400.

As shown in FIG. 9, part of the effective light L1_e may be reflected by the beam splitter 400 that is a half mirror. Because the effective light L1_e passes through the second polarizer 820 and then is incident as light of the second polarization (⊙) on the optical coupler 700, the effective light L1_e is absorbed by the first polarizer 810 that transmits light of the first polarization (↔). Accordingly, an image formed by the display device 100 may be prevented from leaking outward and being perceived undesirably by another person.

Although the first through third polarizers 810, 820, and 830 and the quarter-wave plate 840 are provided to remove the noise light L2_n1 and the noise light L2_n2 in FIG. 9, this is an example. If necessary, optionally, only the first polarizer 810 and the second polarizer 820 may be provided, or only the first polarizer 810, the quarter-wave plate 840, and the third polarizer 830 may be provided.

Figure 10:
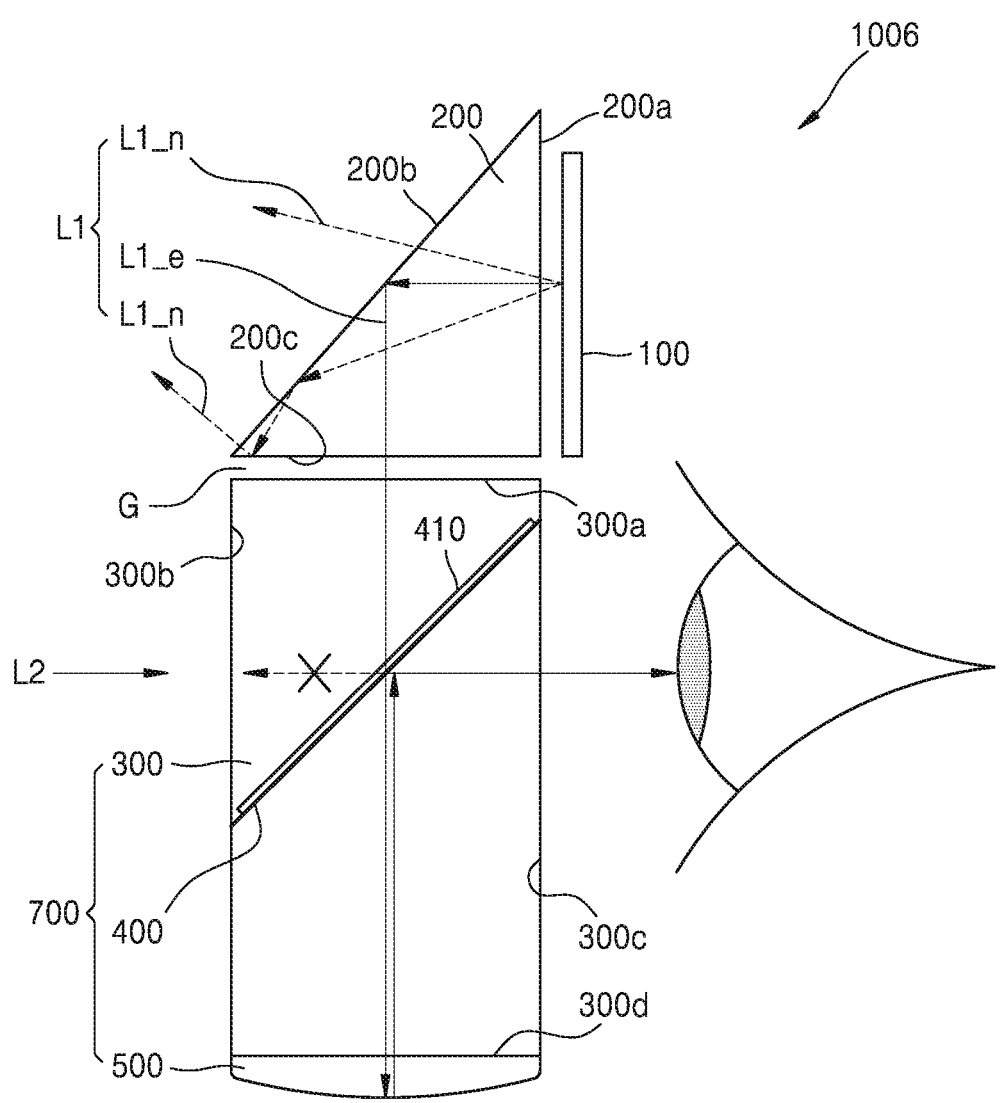
FIG. 10 is a view illustrating a configuration and an optical arrangement of a see-through display apparatus according to another embodiment.

FIG. 10 is a view illustrating a configuration and an optical arrangement of a see-through display apparatus 1006 according to another embodiment.

The see-through display apparatus 1006 includes the display device 100, the optical coupler 700 configured to combine the first light L1 of the first image formed by the display device 100 with the second light L2 of the second image from a path different from a path of the first image, and the noise reduction prism 200 located between the display device 100 and the optical coupler 700 and configured to perform path conversion so that, from among the first light L1, the noise light L1_n is not incident on the optical coupler 700 and the effective light L1_e is incident on the optical coupler 700.

The see-through display apparatus 1006 of the present embodiment is substantially the same as the see-through display apparatus 1001 of FIG. 5 except that an elliptically polarizing plate 410 located on one surface of the beam splitter 400 is further provided.

The elliptically polarizing plate 410 is located on a surface of the beam splitter 400 facing the first surface 300a from among two surfaces of the beam splitter 400 so that part of the effective light L1_e does not leak outward when being reflected by the beam splitter 400. The effective light L1_e incident through the first surface 300a becomes elliptically polarized light due to the elliptically polarizing plate 410 before reaching the beam splitter 400, and part of the effective light L1_2 that becomes the elliptically polarized light is reflected by the beam splitter 400 to become elliptically polarized light in the opposite direction and is incident again on the elliptically polarizing plate 410. The part of the effective light L1_2 that becomes the elliptically polarized light in the opposite direction by being reflected by the beam splitter 400 is absorbed by the elliptically polarizing plate 410 without being transmitted through the elliptically polarizing plate 410.

In this structure, an image formed by the display device 100 may be prevented from leaking outward and being perceived undesirably by another person.

Figure 11:
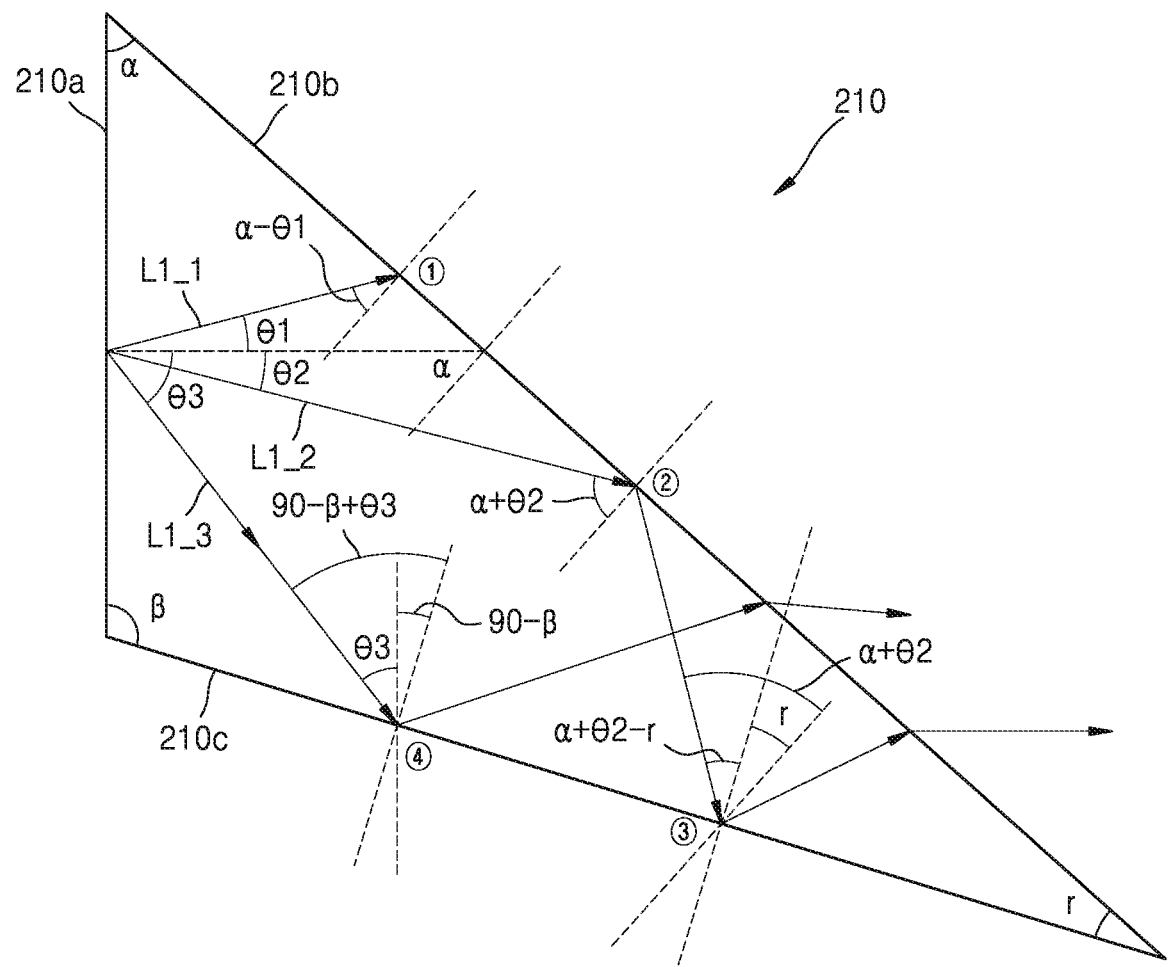
FIG. 11 is a view illustrating a shape of a noise reduction prism employed by a see-through display apparatus according to another embodiment along with an optical path according to various incidence angles.

FIG. 11 is a view illustrating a shape of a noise reduction prism 210 employed by a see-through display apparatus according to another embodiment along with an optical path according to various incidence angles.

The noise reduction prism 210 includes an incident surface 210a on which first-first light L1_1, first-second light L1_2, first-third light L1_3 of the first image formed by a display device are incident, a first inclined surface 210b inclined with respect to the incident surface 210a, and a second inclined surface 210c inclined with respect to the first inclined surface 210b and facing an optical coupler.

An angle α between the incident surface 210a and the first inclined surface 210b, an angle r between the first inclined surface 210b and the second inclined surface 210c, and an angle β between the incident surface 210a and the second inclined surface 210c may be determined to perform path conversion so that effective light is transmitted through the second inclined surface 210c and is incident on the optical coupler and noise light travels in a different direction.

Because the angles α, β, and r depend on an angle range of the effective light, a method of setting the angles α, β, and r will be described with reference to optical paths of the first-first light L1_1, the first-second light L1_2, and the first-third light L1_3 respectively having incidence angles of θ1, θ2, and θ3.

When the first-first light L1_1 having the incidence angle of θ1 is within the angle range of the effective light, an incidence angle α-θ1 on the first inclined surface 210b at a position ① has to be greater than a critical angle for total reflection θc. When the first-first light L1_1 is within an angle range of noise light, the incidence angle α-θ1 may be set to a value equal to or less than the critical angle for total reflection θc.

When the first-second light L1_2 having the incidence angle of θ2 is within the angle range of the effective light, an incidence angle α+θ2 on the first inclined surface 210b at a position ② has to be greater than the critical angle for total reflection θc so that the first-second light L1_2 is totally reflected by the first inclined surface 210b. When the first-second light L1_2 is within the angle range of the noise light, the incidence angle α+θ2 may be set to a value equal to or less than the critical angle for total reflection θc. Even when the first-second light L1_2 is totally reflected by the first inclined surface 210b and reaches the second inclined surface 210c, conditions for an incidence angle α+θ2-r on the second inclined surface 210c may be set according to whether the first-second light L1_2 is the effective light or the noise light.

When the first-third light L1_3 having the incidence angle of θ3 is within the angle range of the effective light, an incidence angle 90° β+θ3 on the second inclined surface 210c at a position ④ has to be greater than the critical angle for total reflection θc so that the first-third light L1_3 is totally reflected by the second inclined surface 210c. When the first-third light L1_3 is within the angle range of the noise light, the incidence angle α+θ2 may be set to a value equal to or less than the critical angle for total reflection θc.

The three angles α, β, and r may be determined by considering the above requirements. The three angles α, β, and r may have different values, or two angles of the three angles α, β, and r may have the same value. Also, one angle of the three angles α, β, and r may be previously set to an obtuse angle or a right angle by considering a positional relationship with other optical elements provided in the see-through display apparatus.

Figure 12:
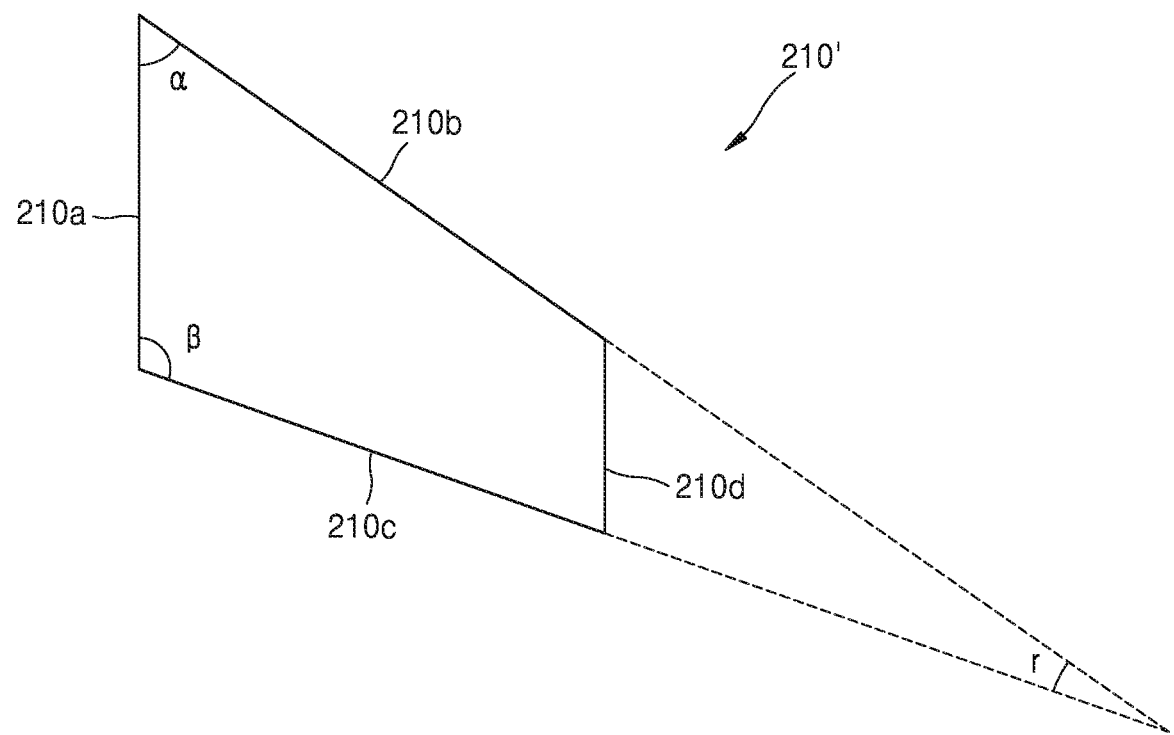
FIG. 12 is a view illustrating a shape of a noise reduction prism employed by a see-through display apparatus according to another embodiment.

FIG. 12 is a view illustrating a shape of a noise reduction prism 210' employed by a see-through display apparatus according to another embodiment.

The noise reduction prism 210' has a shape including a fourth inclined surface 210d connecting the first inclined surface 210b to the second inclined surface 210c by cutting an end of the noise reduction prism 210 having the angles α, β, and r of FIG. 11. Relative inclination angles of the incident surface 210a, the first inclined surface 210b, and the second inclined surface 210c are the same as those in FIG. 11, and thus path conversion may be performed so that effective light is transmitted through the second inclined surface 210c and noise light travels in a different direction.

Also, because the noise reduction prism 210' is formed by cutting a portion of the noise reduction prism 210, a volume of the see-through display apparatus employing the noise reduction prism 210' may be reduced.

Because any of the above see-through display apparatuses may show both an image formed by a display device and an image of the real world to an observer, the see-through display apparatus may be used to implement augmented reality (AR).

The AR may further enhance perception of and interaction with the real world by overlaying a virtual object or information on a real world environment. For example, at the observer's position, additional information about the real world environment may be formed by an image forming unit and may be provided to the observer. An AR display may be applied to a ubiquitous environment or an Internet of things (IoT) environment.

The image of the real world is not limited to a real environment, and may be, for example, an image formed by another imaging device. Accordingly, the see-through display apparatus may be applied to a multi-image display apparatus showing two images.

The see-through display apparatus may be configured as a wearable apparatus. All or some of elements of the see-through display apparatus may be configured as wearable elements.

For example, the see-through display apparatus may be applied to a head-mounted display (HMD) apparatus. Also, the disclosure is not limited thereto, and the see-through display apparatus may be applied to a glasses-type display apparatus or a goggle-type display apparatus.

The see-through display apparatus may interoperate with or may operate by being connected to other electronic devices such as smartphones. For example, a controller for driving the see-through display apparatus may be provided in a smartphone. In addition, the see-through display apparatus may be provided in a smartphone, and the smartphone itself may be used as a see-through display apparatus.

The see-through display apparatus may provide a combined image having a reduced noise component of an image formed by a display device.

The see-through display apparatus may additionally provide a combined image having a reduced noise component of real image light, and/or may prevent an image formed by a display device from leaking outward.

Accordingly, the see-through display apparatus may provide an AR display having high quality.

While one or more embodiments have been described with reference to the figures, it will be understood by one of ordinary skill in the art that various changes in form and details may be made therein without departing from the spirit and scope as defined by the following claims.

What is claimed is:

1. A see-through display apparatus comprising:
   a display device;
   an optical coupler configured to:
      obtain a combined image by combining a first image from the display device with a second image from a path different from a path of the first image; and
      emit the obtained combined image,
   wherein the optical coupler comprises a first surface on which the first image is incident, a second surface on which the second image is incident, and an exit surface through which the combined image is emitted; and
   a noise reduction prism disposed directly between the display device and the optical coupler in a path of light from the display device to the optical coupler, and comprising a plurality of inclined surfaces configured to perform path conversion so that, among light of the first image, effective light of a predetermined angle range is incident on the optical coupler and noise light of a remaining angle range remaining from the predetermined angle range is not incident on the optical coupler, wherein the noise light is incident on the incident surface of the noise reduction prism at an angle non-perpendicular to the incident surface of the noise reduction prism.

2. The see-through display apparatus of claim 1, wherein the noise reduction prism comprises:
   an incident surface on which the first image is incident;
   a first inclined surface inclined with respect to the incident surface; and
   a second inclined surface inclined with respect to the first inclined surface, the second inclined surface facing the first surface of the optical coupler.

3. The see-through display apparatus of claim 2, wherein the first surface of the optical coupler is parallel to the second inclined surface of the noise reduction prism.

4. The see-through display apparatus of claim 2, wherein an air gap is disposed between the second inclined surface of the noise reduction prism and the first surface of the optical coupler so that the second inclined surface acts as a total reflection surface.

5. The see-through display apparatus of claim 2, wherein an inclination angle of the first inclined surface with respect to the incident surface is set so that the effective light is totally reflected by the first inclined surface to the second inclined surface and a part of the noise light is transmitted through the first inclined surface.

6. The see-through display apparatus of claim 2, wherein an inclination angle of the second inclined surface with respect to the first inclined surface is set so that the effective light is transmitted through the second inclined surface and is incident on the first surface of the optical coupler.

7. The see-through display apparatus of claim 2, wherein an inclination angle of the second inclined surface with respect to the first inclined surface is set so that a part of the noise light that is totally reflected by the first inclined surface is totally reflected by the second inclined surface through the first inclined surface.

8. The see-through display apparatus of claim 2, wherein the second inclined surface is connected to the incident surface.

9. The see-through display apparatus of claim 8, wherein an angle between the second inclined surface and the incident surface is a right angle, and
   wherein an angle between the first inclined surface and the incident surface is different from an angle between the first inclined surface and the second inclined surface.

10. The see-through display apparatus of claim 2, wherein the noise reduction prism further comprises a third inclined surface connecting the second inclined surface to the incident surface.

11. The see-through display apparatus of claim 10, wherein the third inclined surface is parallel to the first inclined surface.

12. The see-through display apparatus of claim 2, wherein the noise reduction prism further comprises a third inclined surface connecting the first inclined surface to the second inclined surface.

13. The see-through display apparatus of claim 12, wherein the third inclined surface is parallel to the incident surface.

14. The see-through display apparatus of claim 2, wherein the noise reduction prism is disposed so that the incident surface of the noise reduction prism and the exit surface of the optical coupler are on a same plane.

15. The see-through display apparatus of claim 2, wherein the noise reduction prism is disposed so that the incident surface of the noise reduction prism and the second surface of the optical coupler are on a same plane.

16. The see-through display apparatus of claim 1, wherein an angle between the first surface and the second surface of the optical coupler is an obtuse angle.

17. The see-through display apparatus of claim 1, wherein the optical coupler comprises:
an optical waveguide comprising the first surface, the second surface, the exit surface, and a third surface opposite to the first surface;
a beam splitter disposed in the optical waveguide and inclined with respect to the exit surface; and
a concave mirror disposed adjacent to the third surface.

18. The see-through display apparatus of claim 17, wherein the beam splitter comprises a half mirror.

19. The see-through display apparatus of claim 17, further comprising a plurality of polarizers configured to prevent a part of light of the second image that is obliquely incident on the second surface from being emitted from the optical coupler.

20. The see-through display apparatus of claim 19, wherein the plurality of polarizers comprise:
a first polarizer disposed on the second surface; and
a second polarizer disposed on the first surface and having a polarization axis perpendicular to a polarization axis of the first polarizer.

21. The see-through display apparatus of claim 20, further comprising:
a quarter-wave plate disposed between the third surface and the concave mirror; and
a third polarizer disposed on the exit surface and having a polarization axis parallel to the polarization axis of the first polarizer.

22. The see-through display apparatus of claim 17, further comprising an elliptically polarizing plate disposed on one surface of the beam splitter.

23. The see-through display apparatus of claim 1, wherein the see-through display apparatus is a wearable device.

24. A see-through display apparatus comprising:
a display device;
an optical coupler configured to:
obtain a combined image by combining a first image from the display device along a first path, with a second image from a second path different from the first path; and
emit the obtained combined image,
wherein the optical coupler comprises a first surface on which the first image is incident, a second surface on which the second image is incident, and an exit surface through which the combined image is emitted; and
a noise reduction prism disposed directly between the display device and the optical coupler in a path of light from the display device to the optical coupler, and comprising an incident surface on which the first image from the display device is incident, a first inclined surface inclined with respect to the incident surface, and a second inclined surface inclined with respect to the first inclined surface, the second inclined surface facing the first surface of the optical coupler,
wherein a first angle between the incident surface and the first inclined surface, a second angle between the first inclined surface and the second inclined surface, and a third angle between the second inclined surface and the incident surface are set so that, among light of the first image, effective light of a predetermined angle range is incident on the optical coupler and noise light of a remaining angle range remaining from the predetermined angle range is not incident on the optical coupler, wherein the noise light is incident on the incident surface of the noise reduction prism at an angle non-perpendicular to the incident surface of the noise reduction prism.

25. The see-through display apparatus of claim 24, wherein the first angle the second angle and the third angle are set further based on a critical angle for total reflection that is determined by the predetermined angle range of the effective light and a refractive index of the noise reduction prism.

26. The see-through display apparatus of claim 24, wherein the display device, the incident surface and the exit surface are on a same plane, and
wherein an end portion of the optical coupler is cut so that the display device is disposed between the incident surface and the exit surface.

* * * * *